United States Patent
Hamura et al.

(10) Patent No.: US 7,905,692 B2
(45) Date of Patent: Mar. 15, 2011

(54) PROCESSING MACHINE WITH RECIPROCATION DEVICE

(75) Inventors: Masayuki Hamura, Yamanashi (JP); Kenzo Ebihara, Yamanashi (JP)

(73) Assignee: Fanuc Ltd (JP)

( * ) Notice: Subject to any disclaimer, the term of this patent is extended or adjusted under 35 U.S.C. 154(b) by 322 days.

(21) Appl. No.: 12/324,988

(22) Filed: Nov. 28, 2008

(65) Prior Publication Data

US 2009/0229439 A1    Sep. 17, 2009

(30) Foreign Application Priority Data

Mar. 11, 2008  (JP) ................................ 2008-061599

(51) Int. Cl.
*B23D 3/02* (2006.01)
*B23D 7/10* (2006.01)

(52) U.S. Cl. ........ 409/305; 409/315; 409/316; 409/317; 409/326; 409/337; 82/904; 310/15; 310/17; 310/12.01; 310/12.31

(58) Field of Classification Search ............... 409/304, 409/305, 313, 315, 316, 317, 318, 319, 326, 409/327, 336, 337, 345, 347, 348, 165, 166, 409/168, 184, 185, 199, 201, 211, 216, 204, 409/206, 221, 237, 238, 292; 82/904, 122; 29/30, 27 C, 27 R; 310/12.01, 12.31, 15, 310/17

See application file for complete search history.

(56) References Cited

U.S. PATENT DOCUMENTS

| | | | | |
|---|---|---|---|---|
| 436,078 | A * | 9/1890 | Evans | 409/305 |
| 2,553,251 | A * | 5/1951 | Gutterman | 310/30 |
| 4,924,727 | A * | 5/1990 | Pearl et al. | 74/603 |
| 6,585,461 | B1 * | 7/2003 | Saito | 409/309 |
| 6,744,155 | B1 | 6/2004 | Stoiber | |
| 6,765,318 | B2 * | 7/2004 | Sawada et al. | 310/12.01 |
| 7,344,342 | B2 * | 3/2008 | Kawai et al. | 409/326 |
| 7,492,066 | B2 * | 2/2009 | Kawai et al. | 310/15 |
| 2007/0103262 | A1 | 5/2007 | Kawai et al. | |
| 2009/0003946 | A1 * | 1/2009 | Chen | 408/111 |
| 2009/0242224 | A1 * | 10/2009 | Hamura et al. | 173/152 |
| 2010/0045118 | A1 * | 2/2010 | Hamura et al. | 310/17 |

FOREIGN PATENT DOCUMENTS

| | | |
|---|---|---|
| CN | 1695895 A | 11/2005 |
| EP | 1674198 A1 * | 6/2006 |
| EP | 1880797 A1 | 1/2008 |
| JP | 62-198032 U | 12/1987 |
| JP | 1115501 A | 5/1989 |
| JP | 01121609 U | 8/1989 |
| JP | 1205909 A | 8/1989 |
| JP | 2139112 A | 5/1990 |
| JP | 02-274410 A * | 11/1990 |
| JP | 2005014169 A | 1/2005 |
| JP | 2005-279902 A * | 10/2005 |
| JP | 2007-130712 A | 5/2007 |

OTHER PUBLICATIONS

Machine Translation of JP-2005-279902-A, which JP '902 was published Oct. 2005.*

(Continued)

*Primary Examiner* — Erica E Cadugan
(74) *Attorney, Agent, or Firm* — Lowe Hauptman Ham & Berner, LLP

(57) ABSTRACT

An angle adjusting mechanism or a linear axis of a processing machine is provided with a reciprocation device. A tool and a tool cutting mechanism are mounted on a moving part of the reciprocation device. A workpiece is processed by the tool based on a combination of the drive of the processing machine and the drive of the reciprocation device.

4 Claims, 11 Drawing Sheets

OTHER PUBLICATIONS

Notice of Reasons for Rejection for JP 2008-061599 mailed Jun. 23, 2009.
Notice of Reasons for Rejection of JP 2008-061599 mailed Feb. 24, 2009.
European Search Report for application No. 08105953.7, issued Apr. 4, 2010.
Chinese Office Action for 200910005723.X mailed Apr. 29, 2010.

* cited by examiner 9 (DIRECTION 4)
9 (DIRECTION 5)
100b

PROCESSING MACHINE WITH RECIPROCATION DEVICE

RELATED APPLICATIONS

The present application is based on, and claims priority from, Japanese Application Number 2008-061599, filed Mar. 11, 2008, the disclosure of which is hereby incorporated by reference herein in its entirety.

BACKGROUND OF THE INVENTION

1. Field of the Invention

The present invention relates to a processing machine for forming micro grooves, and more particularly, to a processing machine provided with a reciprocation device.

2. Description of the Related Art

An optical component, such as a diffraction grating, has a large number of micro grooves on its surface. An ultra-precision machine is used to work the micro grooves on the optical component. The optical component should be formed with thousands to ten-thousands of micro grooves, so that the processing time for the micro grooves is inevitably long. In order to shorten the processing time, therefore, dedicated processing machines for high-speed processing are frequently used according to individual processing shapes.

Japanese Patent Application Laid-Open No. 2007-130712 discloses a processing machine configured to process a workpiece with a tool that is reciprocated at high speed with respect to the workpiece, which can reduce a force required when a moving direction of the processing machine is reversed, thereby enabling to carry out a straight groove processing at high speed.

Further, the shapes of micro grooves formed on optical components are becoming more and more complicated. In many cases, grooves are formed with gradually varying angles or formed on curved surfaces, for example. Thus, there is a demand for a processing machine capable of high-speed micro-processing and of flexibly coping with processing for micro grooves of various shapes.

SUMMARY OF THE INVENTION

Accordingly, the object of the present invention is to provide a processing machine capable of high-speed micro-processing.

A processing machine according to the present invention, which is capable of high-speed micro-processing, comprises at least one angle adjusting mechanism or at least one linear axis. The angle adjusting mechanism or linear axis is fitted with a reciprocation device, and the reciprocation device has a moving part to which a tool and a tool cutting mechanism are attached. The tool is configured to process a workpiece based on a combination of the drive of the processing machine and the drive of the reciprocation device.

The reciprocation device may be configured to take an arbitrary angular position with respect to a fixed part of the processing machine by the angle adjusting mechanism.

The reciprocation device may be configured to move vertically and perform processing when the tool moves vertically downward with respect to a fixed part of the processing machine.

The reciprocation device may have two moving parts which are driven in opposite directions to each other on one axis, and the tool and the tool cutting mechanism may be attached to one of the two moving parts that is lighter in weight. The reciprocation device may have a mechanism for canceling the dead weight of the moving part to which the tool and the tool cutting mechanism are attached. Further, the mechanism for canceling the dead weight of the moving part includes a chamber stored with a compressible fluid. Furthermore, the chamber stored with the compressible fluid may be connected to an external container by a pipe.

According to the present invention constructed in this manner, there may be provided a processing machine capable of high-speed micro-processing and of forming micro grooves of various shapes with high precision.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
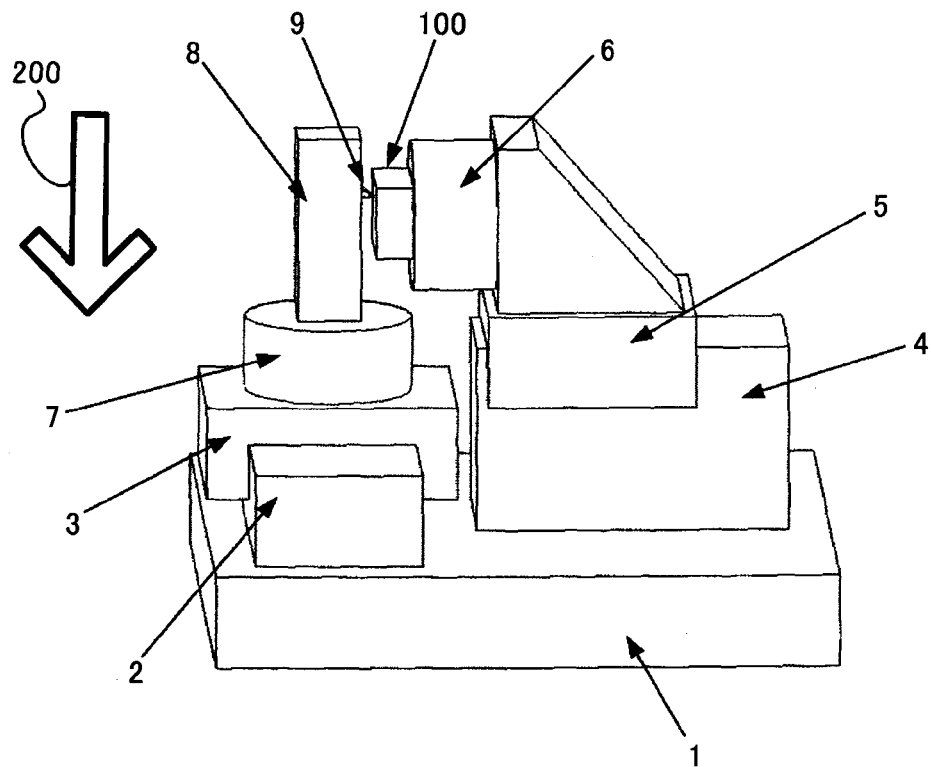
FIG. 1 is a perspective view showing a principal part of a processing machine according to one embodiment of the present invention and illustrates an example in which a workpiece is mounted on a B-axis table, and a reciprocation device is set on a C-axis table for processing.

FIG. 1 is a perspective view showing a principal part of a processing machine according to one embodiment of the present invention. A base 1 that is fixed in an installation position in the processing machine carries thereon an X-axis guide 2 that slidably supports an X-axis slide 3 and a Y-axis guide 4 that slidably supports a Y-axis slide 5. A C-axis table 7 as an angle adjusting mechanism is set on the X-axis slide 3. A B-axis table 6 is set on the Y-axis slide 5.

FIG. 1 shows an example in which a workpiece 100, an object to be processed, is mounted on the B-axis table 6, a reciprocation device 8 is set on the C-axis table 7 for rotation around a C-axis, and the workpiece 100 is processed. The angle adjusting mechanism for the C-axis table 7 may be formed of a tilt table mechanism or a mechanism that can freely vary three-direction angles by means of a spherical bearing, as well as of a mechanism based on a rotary table, such as the one shown in FIG. 1.

A surface of the workpiece 100 set on the B-axis table 6 is micro-grooved by using a tool 9 that is attached to a moving part of the reciprocation device 8. Micro-grooves can be formed on the workpiece surface by moving the tool 9 in the vertical direction (designated by numeral 200) of FIG. 1 by means of the reciprocation device 8.

In the example of processing shown in FIG. 1, the tool 9 is reciprocated in the vertical direction by means of the reciprocation device 8 so that it moves vertically downward as the surface of the workpiece 100 is micro-grooved. If this micro-grooving is executed, chips that are produced when the surface of the workpiece 100 is cut are caused to flow down together with a cutting fluid by gravity. Therefore, the chips produced by the workpiece cutting can be prevented from being caught by the tool 9. Thus, the processing requires no stop time for the removal of the chips.

Figure 2:
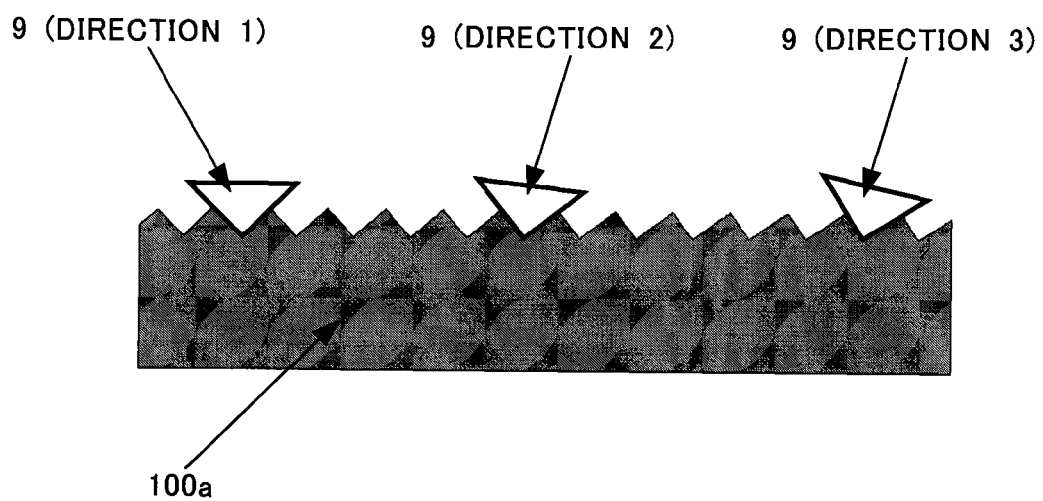
FIG. 2 is a view of micro grooves formed by the processing operation shown in FIG. 1, taken in the direction of processing.

FIG. 2 is a schematic view of a workpiece 100a with micro grooves formed thereon by the processing operation shown in FIG. 1, taken in the direction of processing. As shown in FIG. 2, the angles of the micro grooves on the workpiece surface vary gradually. The angle at which the tool 9 is applied to the workpiece 100a can be varied for directions 1, 2 and 3 shown in FIG. 2, for example, by rotating the C-axis table 7 (angle adjusting mechanism) of the processing machine shown in FIG. 1.

Figure 3:
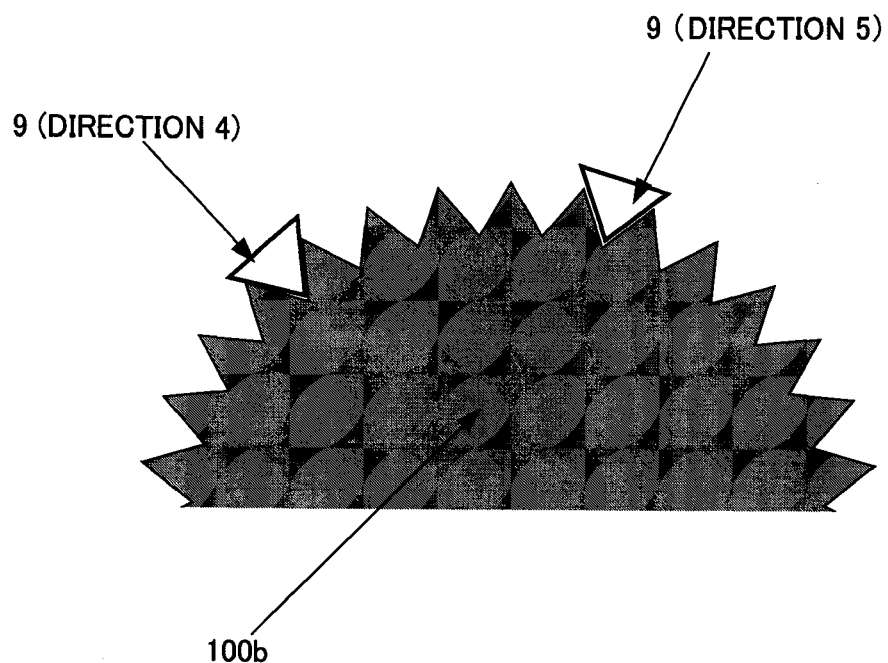
FIG. 3 is a view of a workpiece with micro grooves formed on its curved surface by the processing operation shown in FIG. 1, taken in the direction of processing.

FIG. 3 is a schematic view of a workpiece 100b with micro grooves formed on its outer peripheral surface by the processing operation shown in FIG. 1, taken in the direction of processing. The respective tilt angles of the micro grooves on the surface of the workpiece 100b can be equalized with respect to the radial direction by gradually changing the orientation of the tool 9.

Figure 4:
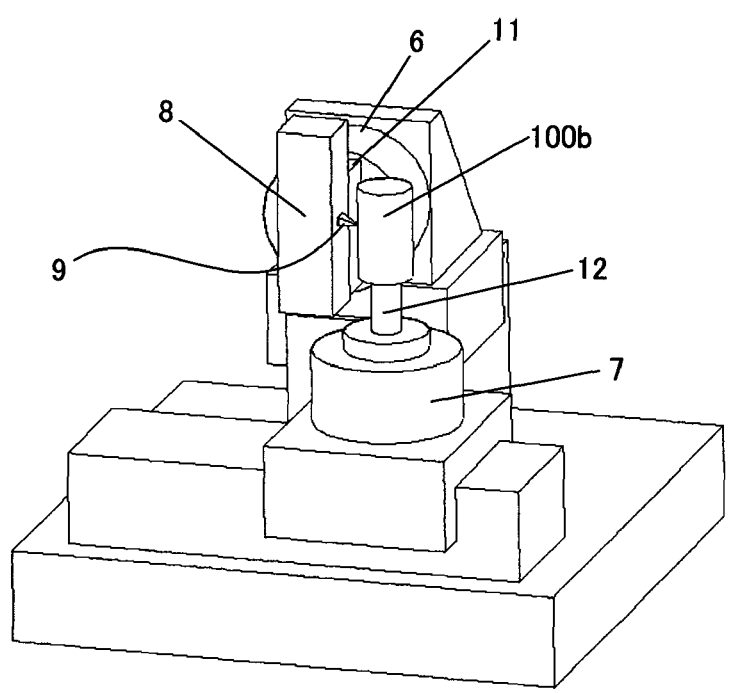
FIG. 4 shows an example in which the cylindrical workpiece is processed in the processing machine shown in FIG. 1 in such a manner that it is mounted on the C-axis table with the reciprocation device mounted on the B-axis table.

FIG. 4 shows an example in which the cylindrical workpiece 100b is processed in the processing machine shown in FIG. 1 in such a manner that it is mounted on the C-axis table 7 by means of a jig 12 with the reciprocation device 8 mounted on the B-axis table 6 by means of a jig 11. The micro grooves can be formed on the outer periphery of the workpiece 100b by rotating and positioning the C-axis table 7.

Figure 5A:
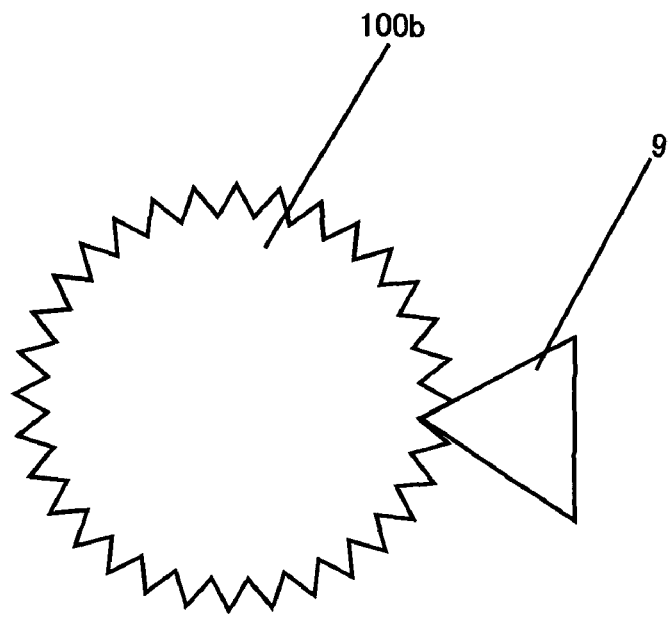
FIG. 5A is a view of the workpiece with the micro grooves formed on its surface by the processing operation shown in FIG. 4, taken in the direction of processing.
Figure 5B:
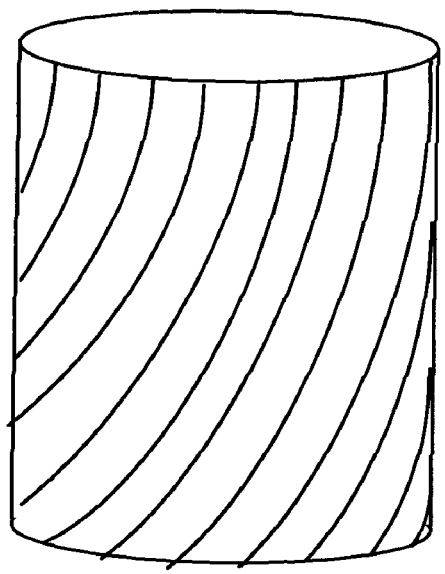
FIG. 5B is a perspective view showing an example in which the micro grooves are formed on the workpiece surface by rotating the C-axis table on which the workpiece is mounted.

FIG. 5A schematically shows straight micro grooves formed on the outer peripheral surface of the cylindrical workpiece 100b by the processing operation shown in FIG. 4. These straight micro grooves may be replaced with curved micro grooves that extend obliquely on the outer peripheral surface of the workpiece 100b. The curved micro grooves can be formed by means of the reciprocation device 8 while rotating the C-axis table 7. FIG. 5B shows an example in which such curved micro grooves are formed on the outer peripheral surface of the cylindrical workpiece 100b by rotating the C-axis table 7 in the processing operation shown in FIG. 4.

Figure 6:
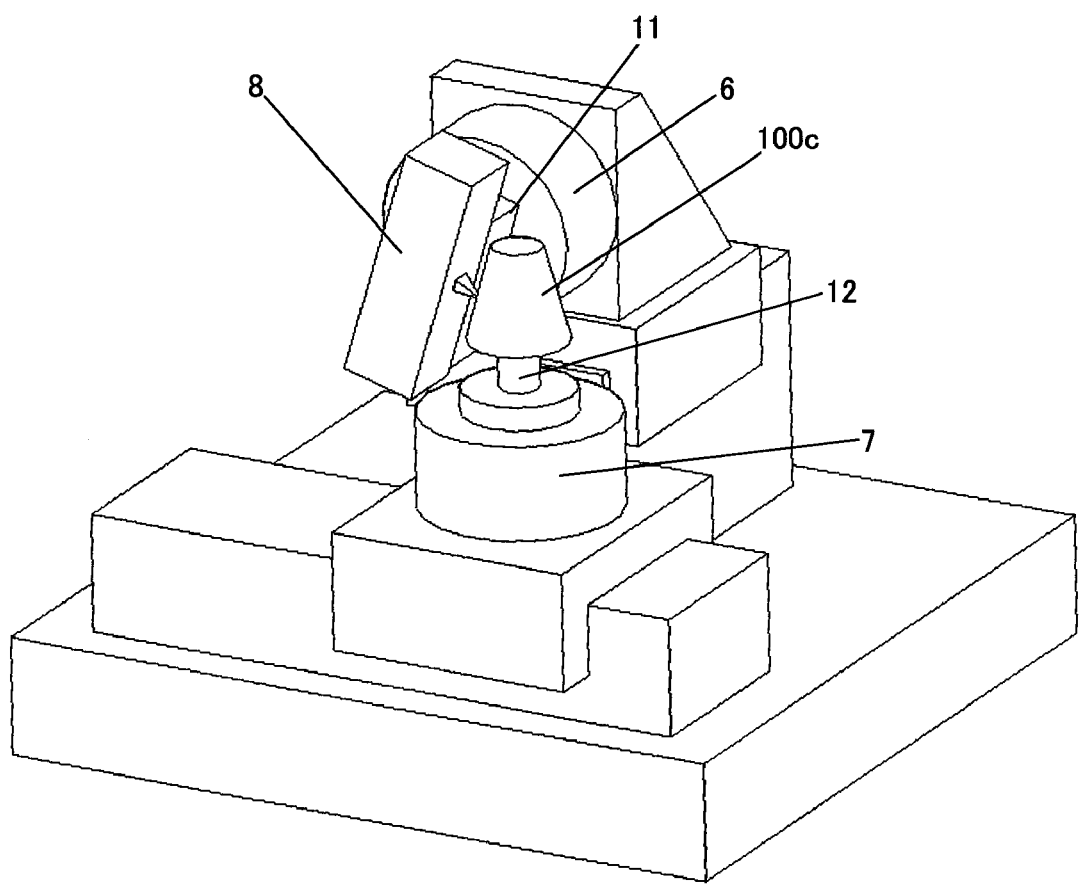
FIG. 6 shows an example in which a truncated conical workpiece is processed in the processing machine shown in FIG. 4 in such a manner that it is mounted on the C-axis table with the reciprocation device mounted obliquely on the B-axis table.
Figure 7:
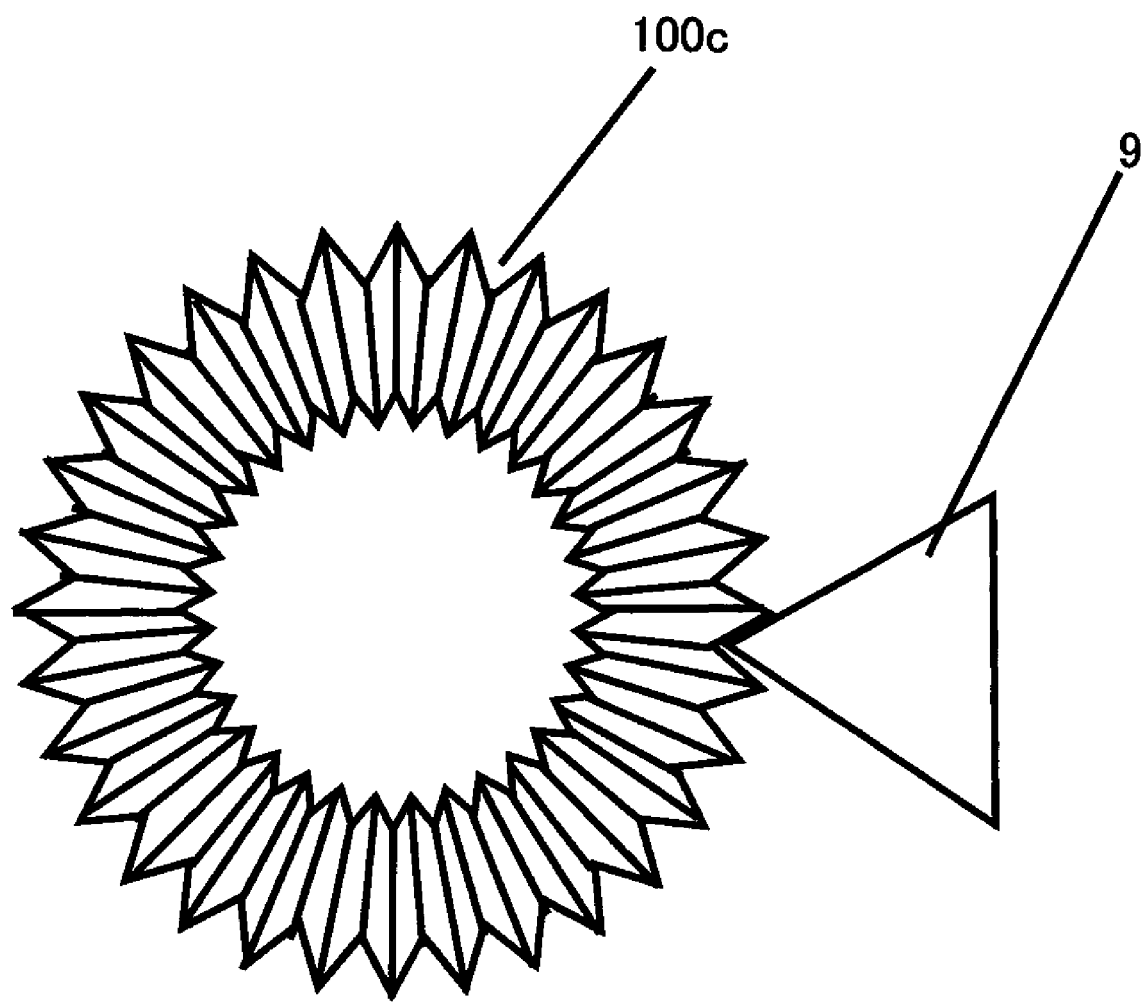
FIG. 7 is a top view showing an example in which grooves are formed on the outer peripheral surface of the truncated conical workpiece by the processing operation shown in FIG. 6.

FIG. 6 shows an example in which a truncated conical workpiece 100c is processed in the processing machine shown in FIG. 4 in such a manner that it is mounted on the C-axis table 7 by means of the jig 12 with the reciprocation device 8 mounted obliquely on the B-axis table 6 (angle adjusting mechanism) by means of the jig 11. Grooves can be formed on the conical outer peripheral surface of the workpiece 100c, as shown in FIG. 7, by the processing operation shown in FIG. 6.

Figure 8:
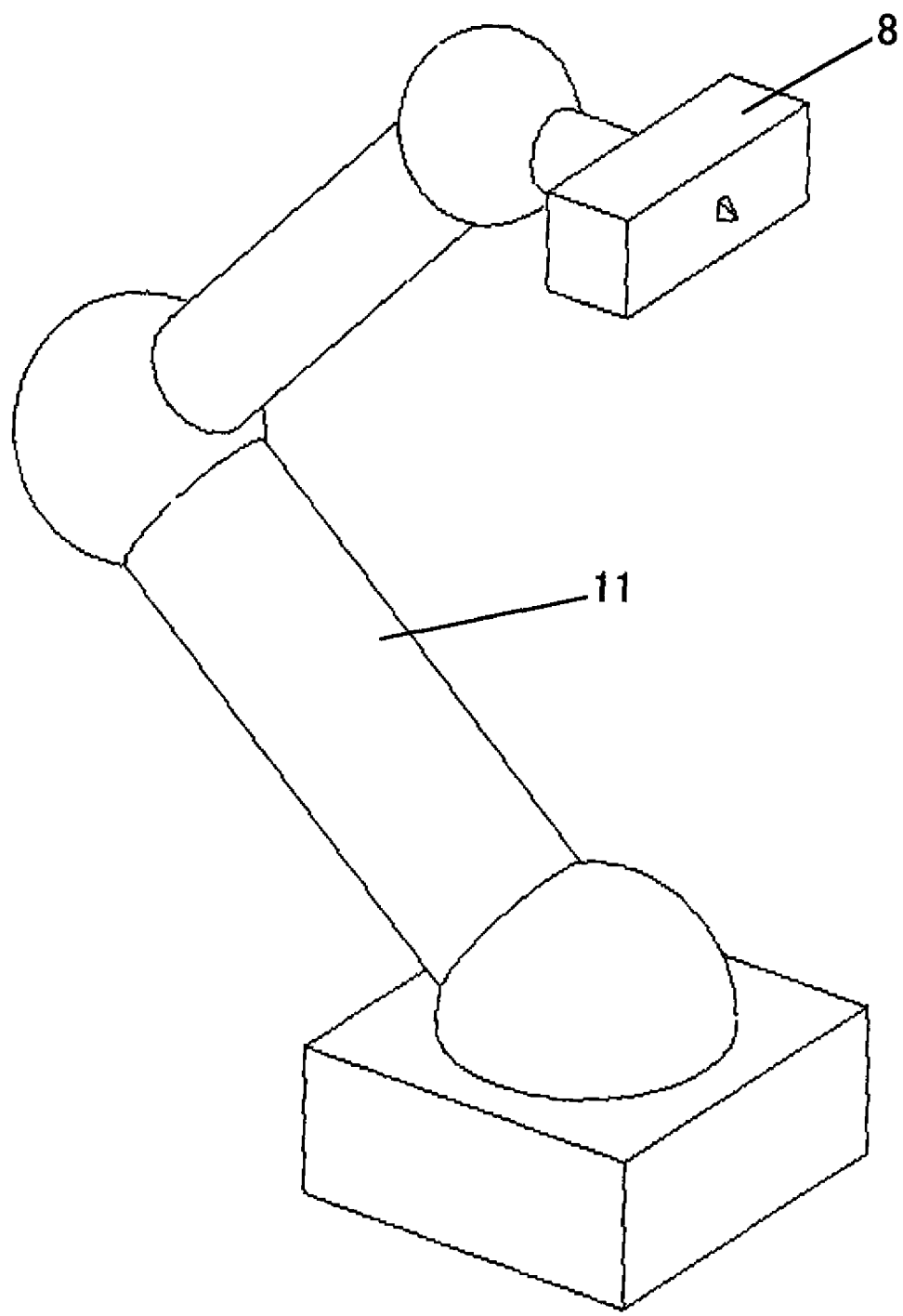
FIG. 8 is a view showing an example in which the reciprocation device is fixed to or held by a hand of a multi-joint robot.

FIG. 8 shows an example in which the reciprocation device 8 is fixed to or held by a hand 21 of a multi-joint robot.

Figure 9:
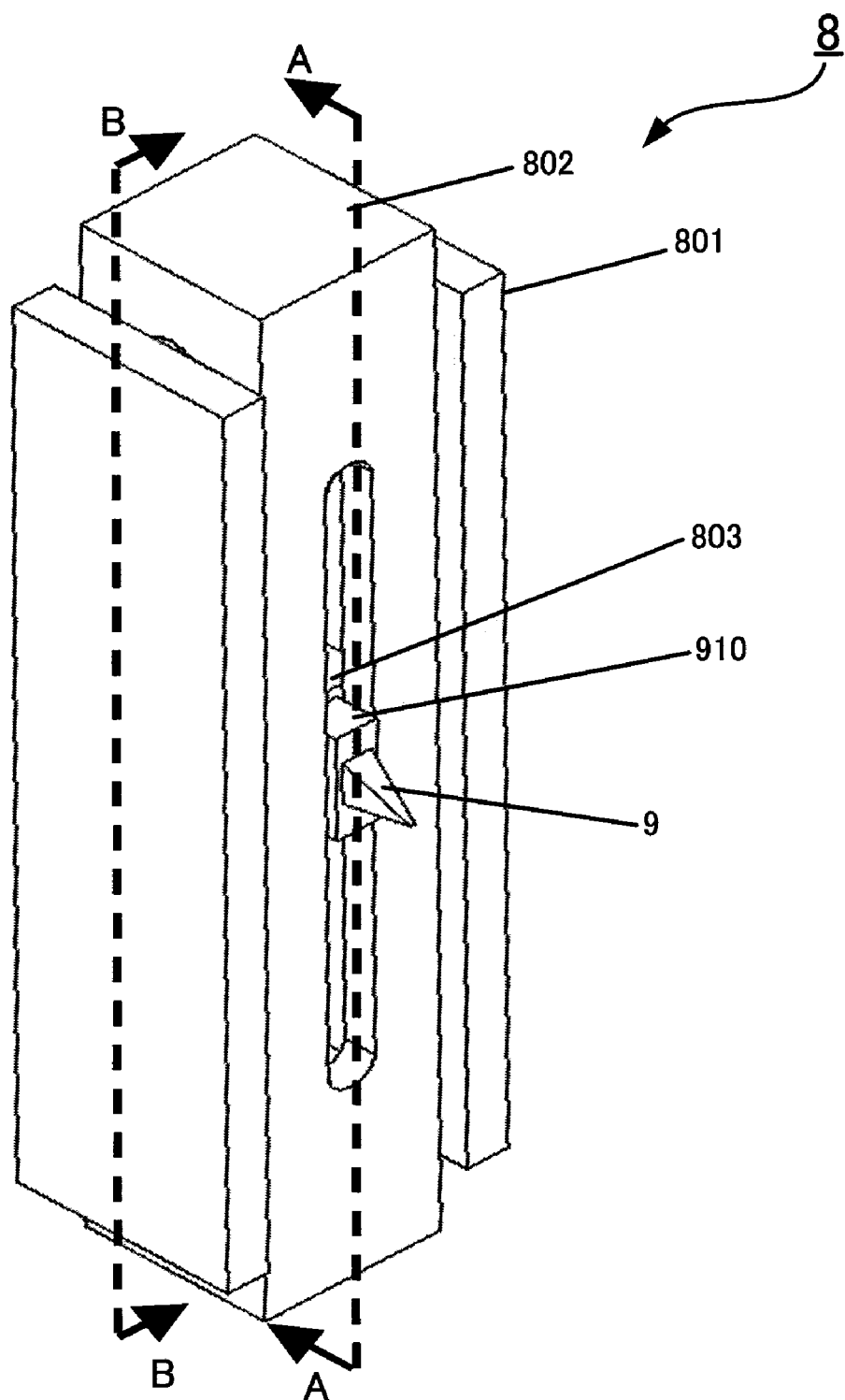
FIG. 9 is a perspective view showing an example of the reciprocation device to be attached to the processing machine of FIG. 1.
Figure 10:
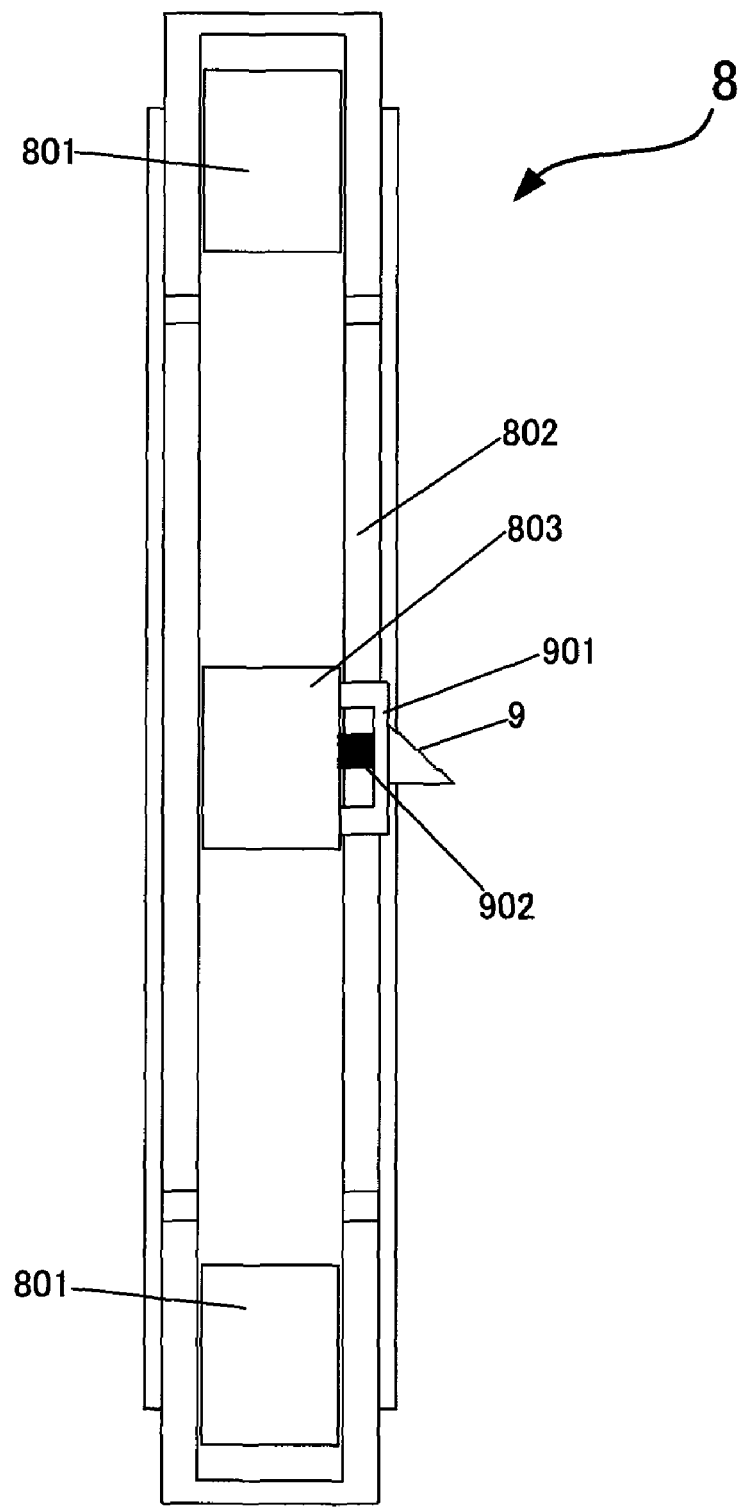
FIG. 10 is a sectional view taken along line A-A of FIG. 9.
Figure 11:
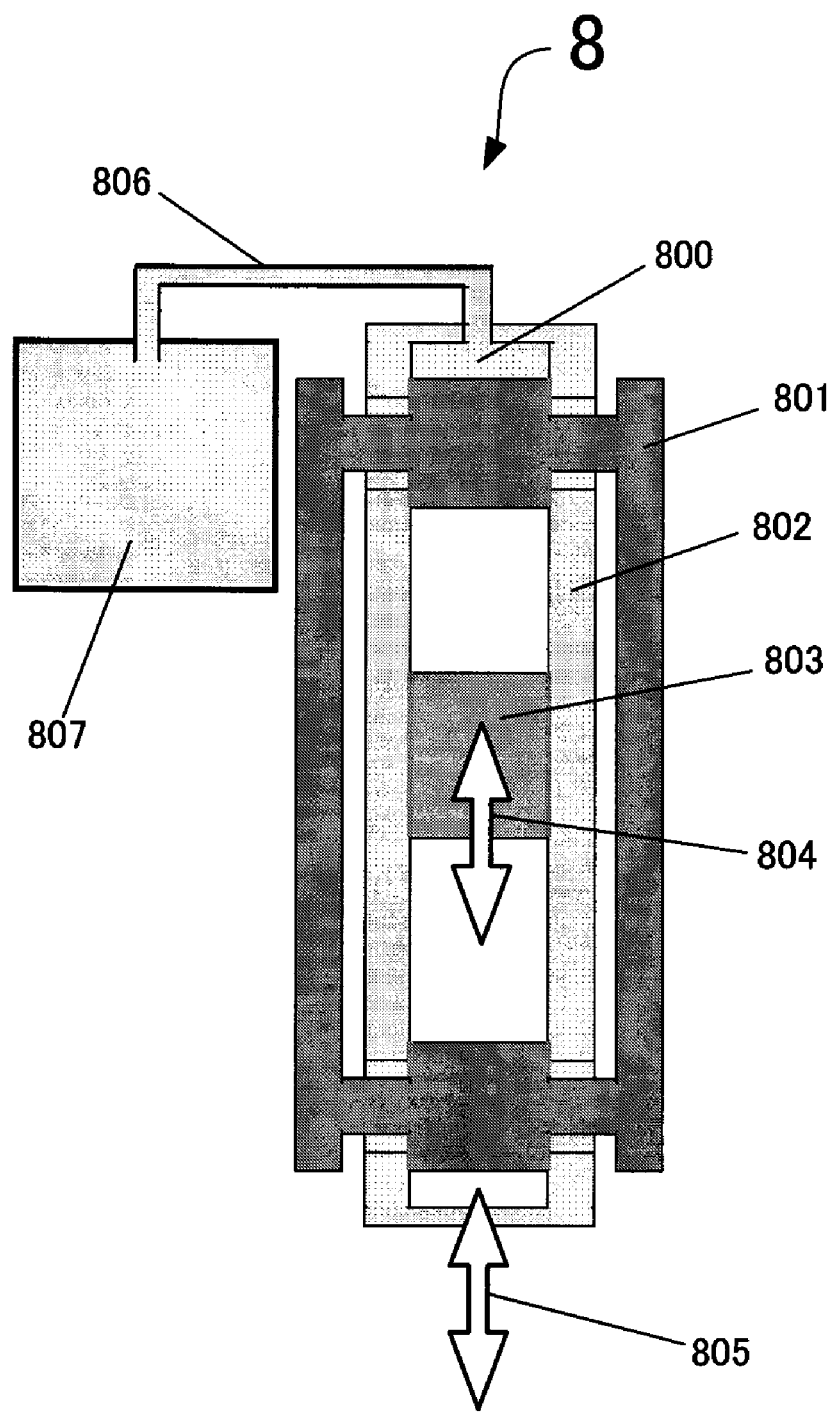
FIG. 11 is a sectional view taken along line B-B of FIG. 9.

An example of the reciprocation device 8 to be attached to the processing machine of FIG. 1 will now be described with reference to FIGS. 9, 10 and 11. The reciprocation device 8 is provided with a slide 803, which includes a tool cutting mechanism 910 that is composed of a leaf spring 901 and a piezoelectric element 902. The slide 803 is also called a shuttle.

In the reciprocation device 8, the slide 803 as a moving part and a base 801 as a fixed part form a fluid bearing in conjunction with a guide 802 (moving part). The guide 802 and the slide 803, for use as first and second moving parts, respectively, are configured to be driven in opposite directions lest a reaction that is caused by the drive of the slide 803 be transmitted to the base 801. The strokes of the slide 803 and the guide 802 are inversely proportional to their respective weights. Therefore, the stroke of the guide 802 can be made shorter than that of the slide 803 by making the guide 802 heavier enough than the slide 803. Although the fluid bearing should preferably be an aerostatic bearing or the like that has low friction, it may alternatively be a dynamic bearing, hydrostatic bearing, or rolling bearing.

In order to cancel the dead weight of the guide 802, air in a chamber 800 applies a pressure for flying the guide 802 off the base 801. If the guide 802 moves vertically with respect to the base 801, the capacity of the chamber 800 varies, whereupon the pressure in the chamber 800 changes. Since the chamber 800 is connected to an external tank 807 by a pipe 806, however, the pressure change in the chamber 800 is mitigated by the capacity of the tank 807. The pressure in the chamber 800 presses the base 801. If the pressure change in the chamber 800 is reduced, therefore, a force that presses the base 801 changes less, so that a force that is transmitted to the processing machine through the base 801 also changes less. In consequence, an influence on the processing machine body is reduced. A compressible fluid, such as nitrogen gas or helium gas, may be used in place of air in the chamber 800. The magnetic force of a permanent magnet or electromagnet or an electrostatic force may be utilized for the mechanism for canceling the dead weight of the guide 802.

Figure 12:
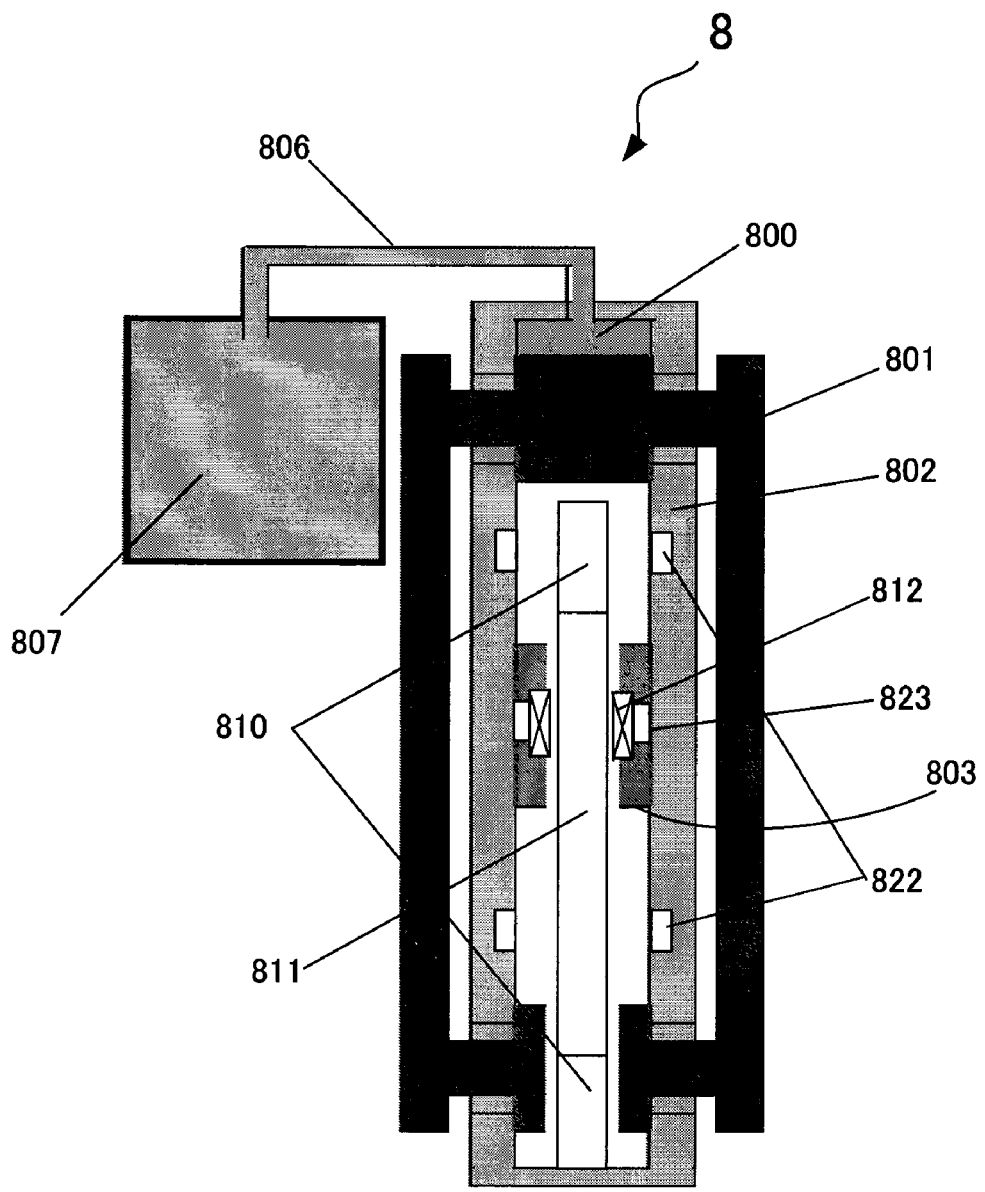
FIG. 12 is a sectional view for illustrating the drive principle of the reciprocation device incorporated in the processing machine of the present invention.

The drive principle of the reciprocation device 8 shown in FIG. 9 will now be described with reference to the sectional view of FIG. 12.

A slide drive magnet 810 is located so that both its poles are opposed to a core 811. Lines of magnetic force generated from the core 811 penetrate a drive coil 812 of the slide 803.

As a current passes through the coil 812, a thrust is generated at right angles to the current and the lines of magnetic force, that is, along the drive axis of the reciprocation device 8.

The slide 803 and the guide 802 are each provided with a magnet for reversal. Repulsion is generated if a reversal magnet 823 of the slide 803 and a reversal magnet 822 of the guide 802 approach each other. If the magnets 802 and 803 are situated close to each other while the slide 803 is moving at a certain speed, therefore, the moving direction of the slide 803 is reversed at substantially the same speed by the repulsion between the reversal magnets. According to this method which makes energy loss low, the current that passes through the coil 812 in order to reciprocate the slide 803 becomes very small. Although the coil 812 that is used in the reciprocation device 8 shown in FIG. 12 is a kind of voice coil motor, the slide 803 may alternatively be moved by means of a conventional linear motor or shaft motor or by air drive.

When the workpiece is processed vertically downward by means of the tool, moreover, it is subjected to the weight of the slide 803 as well as to the thrust that is produced by the coil 812. Accordingly, a force to counter a cutting resistance is greater than in the case of vertically upward or horizontal processing.

In the case of horizontal drive, moreover, a deflection that is caused by the dead weight of the guide 802 is non-negligible. In the case of vertical drive, the guide 802 can never be deformed by its own weight, so that there is also an effect that the straightness of grooves to be formed is improved.

Figure 13A:
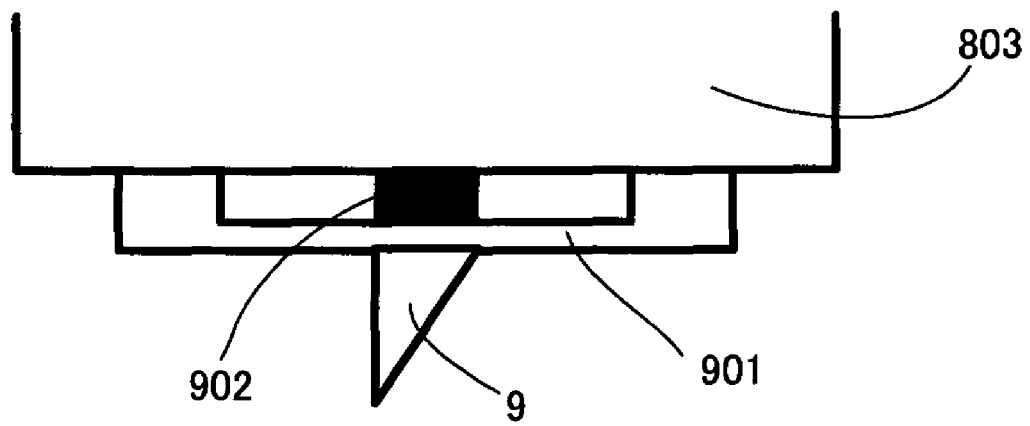
FIG. 13A is a view showing a tool cutting mechanism of the reciprocation device incorporated in the processing machine of the present invention and illustrates a state in which a piezoelectric element for moving a tool in a cutting direction is not extended.
Figure 13B:
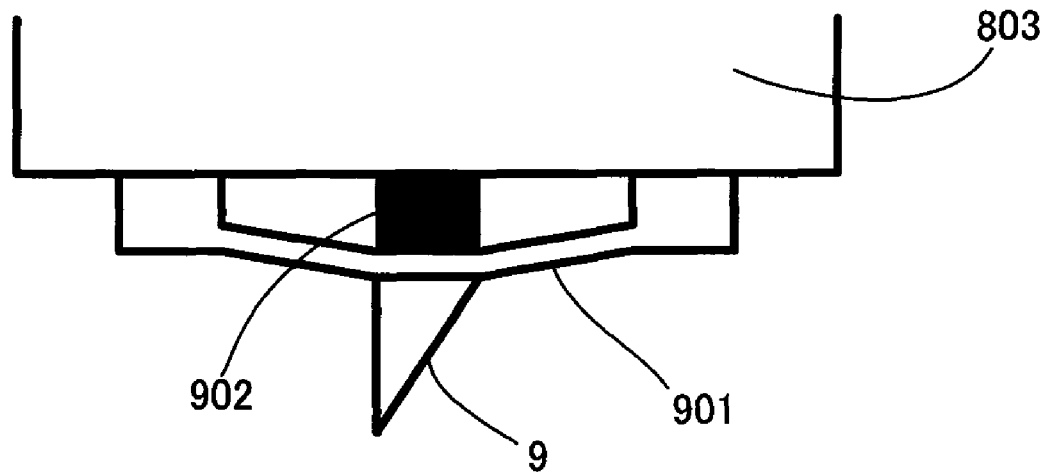
FIG. 13B is a view showing the tool cutting mechanism of the reciprocation device incorporated in the processing machine of the present invention and illustrates a state in which the piezoelectric element for moving the tool in the cutting direction is extended.

FIGS. 13A and 13B are views showing the tool cutting mechanism of the reciprocation device 8 that is incorporated in the processing machine of the present invention. If a voltage is applied to the piezoelectric element 902 shown in FIG. 13A, the element extends in the manner shown in FIG. 13B. By doing this, the tool 9 that is attached to the leaf spring 901 can be moved in a cutting direction.

In processing the workpiece vertically downward, the piezoelectric element is extended for cutting as the slide moves downward. While the slider is moving vertically upward, the voltage applied to the piezoelectric element is reduced to zero, and the tool is repeatedly released for processing.

What is claimed is:

1. A processing machine with a reciprocation device, wherein the processing machine comprises at least one angle adjusting mechanism, the reciprocation device is configured to take an arbitrary angular position by means of the at least one angle adjusting mechanism, and the processing of a workpiece is carried out by combining movements caused by a drive of said at least one angle adjusting mechanism of the processing machine and a drive of the reciprocation device, and wherein
    said reciprocation device comprises a base, a guide, a slide, and a weight canceling mechanism for giving to the guide a force for canceling the weight of the guide,
    said base is fixed to the at least one angle adjusting mechanism,
    said guide is supported on the slide through a bearing,
    said slide has a cutting tool and a cutting tool mechanism, is lighter in weight than said guide, is supported on the guide through the bearing, and is driven by the reciprocation device drive so as to be moved in an axial direction opposite an axial direction in which the guide is moved by the reciprocation device drive with respect to the base.

2. The processing machine with a reciprocation device according to claim 1, wherein said at least one angle adjusting mechanism is configured to cause the reciprocation device to take a position which allows the slide to be driven in a vertical direction, thereby allowing the tool attached to the slide to process the workpiece as the tool is driven downward in a vertical direction.

3. The processing machine with a reciprocation device according to claim 1, wherein said weight canceling mechanism has a chamber in which an air pressure for flying the guide of the base is applied.

4. The processing machine with a reciprocation device according to claim 2, wherein said weight canceling mechanism has a chamber in which an air pressure for flying the guide off the base is applied.

\* \* \* \* \*